(12) United States Patent
Hendriks et al.

(10) Patent No.: US 6,687,056 B2
(45) Date of Patent: Feb. 3, 2004

(54) OPTICAL HEAD

(75) Inventors: Bernardus Hendrikus Wilhelmus Hendriks, Eindhoven (NL); Jorrit Ernst De Vries, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 13 days.

(21) Appl. No.: 10/169,924

(22) PCT Filed: Nov. 15, 2001

(86) PCT No.: PCT/EP01/13333
§ 371 (c)(1),
(2), (4) Date: Jul. 10, 2002

(87) PCT Pub. No.: WO02/41307
PCT Pub. Date: May 23, 2002

(65) Prior Publication Data
US 2003/0179683 A1 Sep. 25, 2003

(30) Foreign Application Priority Data
Nov. 15, 2000 (EP) .............................. 00204020

(51) Int. Cl.[7] .............................. G02B 5/18
(52) U.S. Cl. .................. 359/566; 359/569; 359/570; 359/571
(58) Field of Search ................ 359/566, 569, 359/570, 571, 565, 558; 369/44.14

(56) References Cited

U.S. PATENT DOCUMENTS

| | | | | |
|---|---|---|---|---|
| 5,745,289 A | * | 4/1998 | Hamblen | 359/565 |
| 6,191,889 B1 | * | 2/2001 | Maruyama | 359/566 |
| 6,262,844 B1 | * | 7/2001 | Soskind | 359/565 |
| 6,590,708 B2 | * | 7/2003 | Nakai et al. | 359/558 |

* cited by examiner

Primary Examiner—Drew Dunn
Assistant Examiner—Fayez Assaf
(74) Attorney, Agent, or Firm—Michael E. Belk

(57) ABSTRACT

A lens system includes a lens, a grating and a non-periodic phase structure. The lens system is a-thermalised by a compensation of the temperature-dependence of the spherical aberration of the lens by the temperature-dependence of the spherical aberration of the non-periodic phase structure and the grating. The lens system is also a-spherochromatised by a compensation of the wavelength-dependence of the spherical aberration of the grating by the wavelength-dependence of the spherical aberration of the non-periodic phase structure.

4 Claims, 4 Drawing Sheets

OPTICAL HEAD

Figure 1:
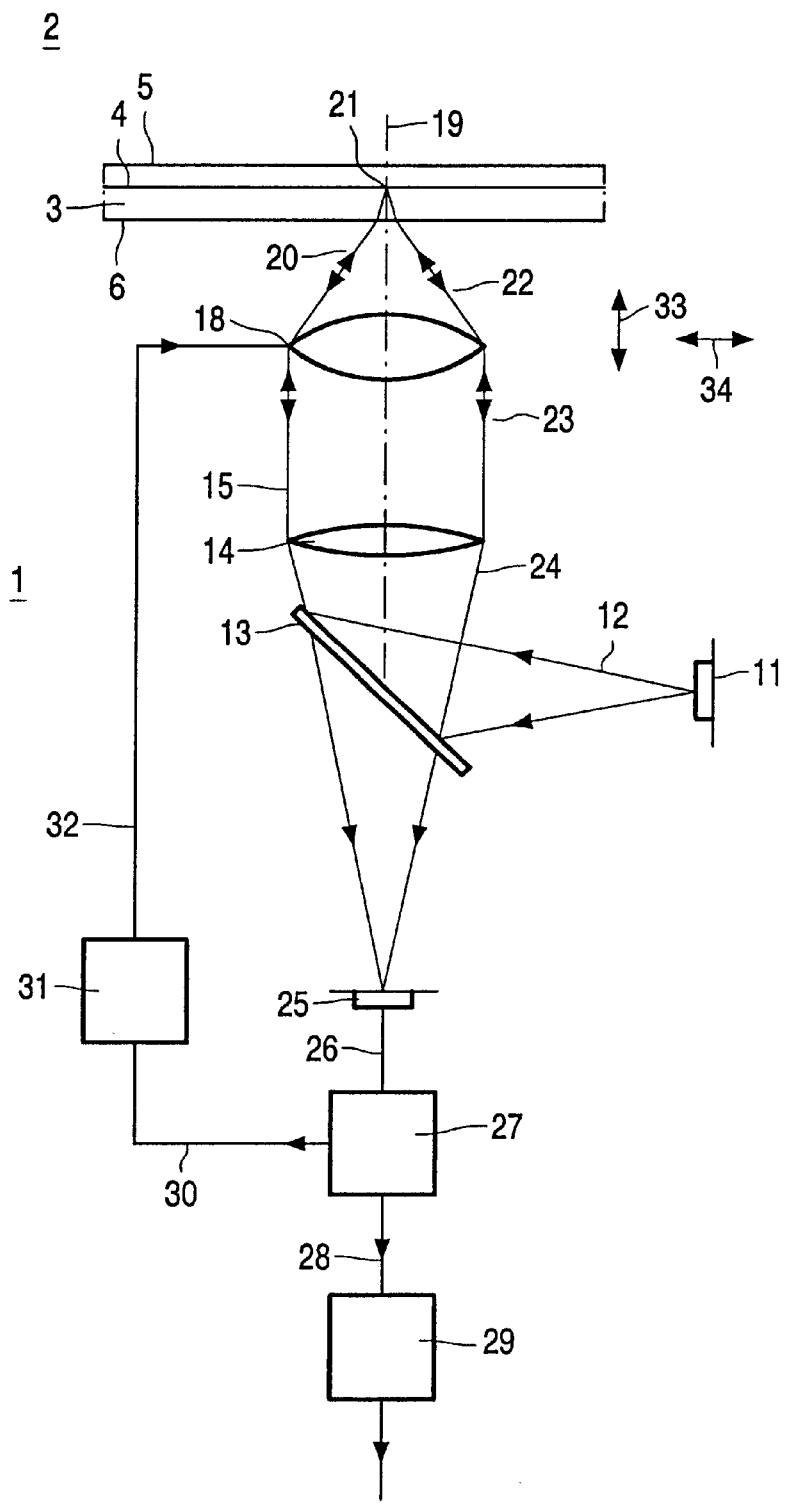
Figure 2A:
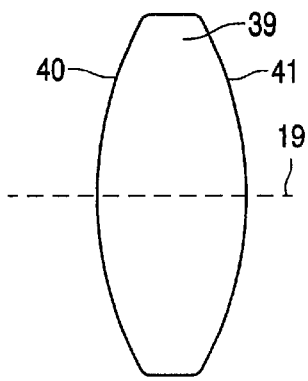
Figure 2B:
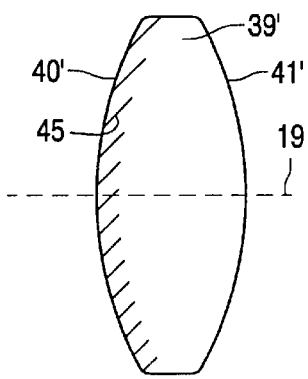
Figure 2C:
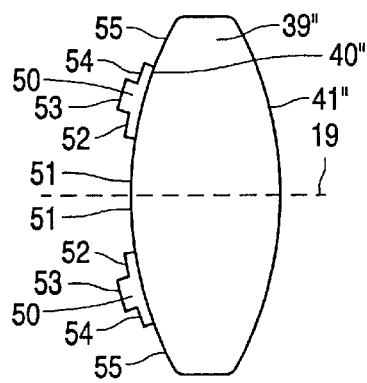
Figure 2D:
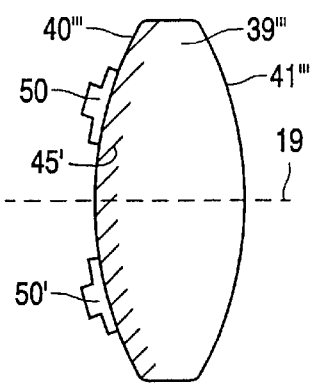

The invention relates to an optical head for scanning the information layer of an optical record carrier. The invention also relates to a lens system for use in such an optical head.

The lens system in an optical head is used to converge a radiation beam from a radiation source to a spot on the information layer of the optical record carrier. A lens in the lens system used as objective lens has generally optical properties that change as a function of temperature, which may cause a deterioration of the quality of the spot. The sensitivity of the lens system to temperature changes can be reduced, i.e. the lens system can be a-thermalised, by arranging a non-periodic phase structure (NPS) in the optical path of the radiation beam as disclosed in the international patent application WO 01/48745 (PHN 17870). Such an NPS introduces a wavefront aberration in the radiation beam as a function of temperature that compensates the wavefront aberration introduced by the lens. However, the NPS makes the lens system more sensitive to wavelength variations in that a change in wavelength introduces spherical aberration in the radiation beam (spherochromatism). Semiconductor lasers may have a significantly different wavelength from batch to batch. For 650 nm lasers commonly used in optical heads this spread may be of the order of 10 nm. Therefore, using an NPS to a-thermalise the lens system may lead to problems of spherochromatism.

Another method to a-thermalise a lens system is to make use of the fact that the wavelength of the semiconductor laser generally changes when temperature changes. A periodic, diffractive structure for converging a radiation beam, such as a grating, is spherochromatic and introduces spherical aberration in the radiation beam passing through the grating when the wavelength of the beam changes. When such a grating is arranged on one of the lens surfaces of a lens in the lens system, it can compensate the spherical aberration introduced by the lens when temperature (and thus the laser wavelength) changes. A drawback of this system is that, when the nominal wavelength varies from batch to batch, an offset in spherochromatism is introduced and the compensation is not adequate anymore.

It is an object of the invention to provide a lens system less insensitive for wavelength variations and at the same time insensitive for temperature variations.

The object is achieved if a lens system according to the invention includes a lens, a grating and a non-periodic phase structure, the lens system being a-thermalised by a compensation of the temperature-dependence of the spherical aberration of the lens by the temperature-dependence of the spherical aberration of the non-periodic phase structure and the grating, and the lens system being a-spherochromatised by a compensation of the wavelength-dependence of the spherical aberration of the grating by the wavelength-dependence of the spherical aberration of the non-periodic phase structure.

The two compensations may be partial or complete. The a-thermalisation is preferably such that the root-mean-square optical path difference (OPD-rms) of the wavefront of a radiation beam passing through the lens system caused by a temperature change of 30 K is less than 20 m$\lambda$, where $\lambda$ is the wavelength of the radiation beam. The a-spherochromatisation is preferably such that the OPD-rms caused by a change in wavelength of 10 nm is less than 20 m$\lambda$ with refocusing; the a-spherochromatisation is also preferably such that the OPD-rms caused by a change in wavelength of 3 nm is less than 20 m$\lambda$ without refocusing.

A preferred embodiment of the lens system is made substantially achromatic. Since the power of the grating is a parameter not fixed by the a-thermalisation or the a-spherochromatisation, the power can be used to make the lens system achromatic.

A further aspect of the invention relates to an optical head for scanning an information layer of an optical record carrier, including a radiation source for generating a radiation beam, a lens system according to the invention for converging the radiation beam on the information layer, and a detection system for converting radiation from the information layer to an electrical detector signal. The a-thermalised and a-spherochromatised lens system reduces the temperature sensitivity of the optical head, making the accuracy of the scanning of the head less dependent on environmental factors and, therefore, more reliable.

A still further aspect of the invention relates to an optical player for scanning an information layer of an optical record carrier, which player includes an optical head according to the invention and an information processing unit for error correction of the detector signal. The improved scanning of the optical head increases the quality of the detector signal and reduces the chances that information read from the record carrier is incorrigible.

The objects, advantages and features of the invention will be apparent from the following more particular description of preferred embodiments of the invention, as illustrated in the accompanying drawings, in which FIG. 1 shows a scanning device according to the invention;

FIGS. 2A–D show four different embodiments of the lens systems;

FIG. 3 shows the wavefront aberration of the objective lens containing an grating and NPS at an elevated temperature; and FIG. 4 shows the wavefront aberration of the combination of the objective lens containing a grating and an NPS at a shifted wavelength after refocusing.

The principle of the compensation of temperature effects will be explained in three steps. First the a-thermalisation of a lens system including a lens and a grating will be considered. Next the a-thermalisation of a lens system including a lens and a non-periodic structure will be described. Finally the a-thermalisation of a lens system according to the invention including a lens, a grating and a non-periodic phase structure will be explained.

In the first step, the lens system includes a lens and a diffractive grating arranged on the lens. The grating may be of the blazed type, such that it directs substantially all the incident radiation in the $p^{th}$-diffraction order. The diffracted radiation is captured by the lens. The grating is rotationally symmetric and is described by a phase function $\Xi$ of the form $$\Xi(r)=Ar^2+Gr^4 \qquad (1)$$

with r the radial coordinate of the grating, A the coefficient determining the optical strength of the grating and G the coefficient determining the spherical aberration introduced by the grating. The value of A is not affected by the a-thermalisation or a-spherochromatisation, as is clear from (9) and (10) below. Its value may be used to achromatize the lens system. The radial position $r_j$ where each zone or grating line starts, is then determined by $$\Xi(r_j)=2\pi j \qquad (2)$$

For diffraction in the $p^{th}$-order the focal length $F_{grating}$ of the grating is given by $$\frac{1}{F_{grating}}=-\frac{A\lambda p}{\pi} \qquad (3)$$

while the amount of spherical aberration generated by the grating in this order is given by $$W = -\frac{\lambda p G F^4 N A^4}{2\pi} \quad (4)$$

where p is the diffraction order, G the coefficient defined in (1), F the focal length of the total lens system and NA the corresponding numerical aperture of the total lens system. The lens design of this embodiment is such that the spherical aberration introduced by the grating is compensated by the spherical aberration introduced by the lens in the nominal design configuration.

The case is now considered where the temperature deviates from the nominal design configuration. The amount of spherical wavefront aberration $W_{lens}$ introduced by the lens when the temperature changes by an amount $\Delta T$ is given by $$W_{lens} = S\Delta T \quad (5)$$

This wavefront aberration must be compensated by the wavefront aberration of the grating and/or the non-periodic phase structure. This can be realized in the following way. When the temperature increases, the lens on which the diffractive grating is present expands. Let the coefficient of linear expansion of the material of which the lens is made be given by $\alpha$. The zone radii $r_j$ will be affected by the expansion and can now be expressed to first order of the temperature change $\Delta T$ as $$r_j(\Delta T) = [1 + \alpha \Delta T] r_j \quad (6)$$

This in turn results in a change of the coefficients A and G, which determine the operation of the grating, with the result given by $$A(\Delta T) = [1 - 2\alpha \Delta T] A \quad (7)$$

$$G(\Delta T) = [1 - 4\alpha \Delta T] G \quad (8)$$

Consequently, from (4) and (8) it then follows that the diffractive grating introduces an additional amount of spherical wavefront aberration $\Delta W_T^{grating}$ when the temperature changes given by $$\Delta W_T^{grating} = +\frac{\lambda p G F^4 N A^4}{2\pi} 4\alpha \Delta T \equiv P\Delta T \quad (9)$$

When however the wavelength changes, the grating introduces also an amount of spherical wavefront aberration $\Delta W_T^{grating}$ given by $$\Delta W_\lambda^{grating} = -\frac{p G F^4 N A^4}{2\pi} \Delta \lambda \equiv \gamma P \Delta \lambda \quad (10)$$

where $\gamma$ is defined by $$\gamma = -\frac{1}{4\alpha\lambda} \quad (11)$$

Consequently, when a-thermalising the lens with a diffractive grating only, the system becomes sensitive to spherochromatism; in other words, the amount of spherical aberration changes when the wavelength changes.

In the second step, the lens system includes a lens and a non-periodic phase structure (NPS). The NPS is arranged in the optical path of the radiation beam and is used to a-thermalise the lens system as described in the international patent application WO 01/48745. The NPS comprises a layer of a dielectric material having a thickness that varies as a function of the radius, forming a number of concentric rings. The $j^{th}$ ring has a height $h_j$, which at the design temperature give rise to a phase change of $m_j 2\pi$ with $m_j$ an integer. The heights $h_j$ are each equal to $m_j h$, with $m_j$ an integer and h equal to $$h = \frac{\lambda}{n(T_0) - 1} \quad (12)$$

where $\lambda$ is the wavelength and $n(T_0)$ is the refractive index of the material of the rings at the wavelength $\lambda$ and the design temperature $T_0$. When the temperature changes by an amount $\Delta T$, the $j^{th}$ ring gives rise to a phase step $\Delta \Phi_j$ which, modulo $2\pi$, is equal to $$\Delta \Phi_j = 2\pi \left( \alpha + \frac{\frac{\partial n}{\partial T}}{n - 1} \right) m_j \Delta T \quad (13)$$

where $\alpha$ is the coefficient of linear expansion of the dielectric material, and n the refractive index. The thermal expansion also increases the width of annular rings; however, this effect can be neglected because an NPS structures having wide zones is considered. The NPS is designed such that it introduces an amount of spherical aberration $W_T^{NPS}$ when the temperature changes by $\Delta T$, given by $$W_T^{NPS} = Q\Delta T \quad (14)$$

On the other hand, when the wavelength changes by an amount $\Delta \lambda$, the above structure gives rise to a phase step which, modulo $2\pi$, is equal to $$\Delta \Phi_j = 2\pi \left( \frac{\frac{\partial n}{\partial \lambda}}{n - 1} - \frac{1}{\lambda} \right) m_j \Delta T \quad (15)$$

$$\cong -\frac{2\pi}{\lambda} m_j \Delta \lambda \quad (16)$$

From (13), (14) and (16) it follows than that the above defined NPS introduces when the wavelength changes an amount of spherochromatism $W_\lambda^{NPS}$ given by $$W_\lambda^{NPS} = \kappa Q \Delta \lambda \quad (17)$$

with $\kappa$ given by $$\kappa = -\frac{1}{\lambda \left( \alpha + \frac{\frac{\partial n}{\partial T}}{n - 1} \right)} \quad (18)$$

Similar as for the diffractive grating, when a-thermalising the lens with an NPS only, the system becomes sensitive to spherochromatism. Hence, spherical aberration arises when the wavelength changes.

For a-thermalisation and reduction of the spherochromatism both a diffractive grating and an NPS are necessary. Therefore, in the third step, the lens system includes a lens, a diffractive grating and a non-periodic phase structure.

The amount of spherical aberration $W_T$ due to a temperature change of $\Delta T$ and the amount of spherical aberration $W_\lambda$ due to a wavelength change of $\Delta \lambda$ of the lens system is given by $$W_T = (S + P + Q)\Delta T \quad (19)$$

$$W_\lambda = (\gamma P + \kappa Q)\Delta \lambda \quad (20)$$

where the spherochromatism introduced by the lens has been neglected, because it is small compared to the spherochromatism of the NPS and the grating. When the NPS and the grating are designed in such a way that $$P = \frac{\kappa}{\gamma - \kappa} S \quad (21)$$

$$Q = \frac{-\gamma}{\gamma - \kappa} S \quad (22)$$

then the total system becomes a-thermal (hence no spherical aberration is introduced when temperature changes) and a-spherochromatic.

Since the power of the diffractive structure is not yet fixed by the above equations, the lens system can also be made achromatic. The lens system is achromatic if the lens and the grating comply with $$\frac{K_0}{V_0} + \frac{K_1}{V_1} = 0 \quad (23)$$

where $K_0$ and $K_1$ are the power of the lens and the grating, respectively, and $V_0$ and $V_1$ the Abbe numbers of the lens and the grating, respectively. The power of an optical element is equal to 1/f with f the focal length of the element. The power of a diffractive element such as a grating increases with increasing wavelength, whereas the power of a refractive element such as a lens decreases with increasing wavelength. The Abbe number $V_1$ of a grating is equal to −3,452; the Abbe number $V_0$ of a lens made of a normal glass lies in the range from 20 to 95 and the Abbe number $V_0$ of a plastic lens lies in the range from 35 to 65. Since the magnitude of $V_1$ is always smaller than the magnitude of $V_0$, $K_1$ must also be smaller than $K_0$ to comply with (23). Hence, the grating should have a relatively low power, which improves its manufacturability.

The grating and non-periodic structure may be made of the same plastic material to facilitate integration of the elements. When the plastic COC is used for both elements, the following numerical values are obtained. COC has a refractive index n=1.5309 for λ=650 nm, a coefficient of linear expansion α=60 $10^{-6}$/K and dn/dT=−10 $10^{-5}$/K. Substituting this in (11) and (18) yields κ/λ=−1.87 and hence $$P = -0.65 S \quad (24)$$

$$Q = -0.35 S \quad (25)$$

Consequently, for this material the diffractive grating has to compensate 65% of the spherical aberration introduced by lens when the temperature changes and the NPS the remaining 35%. Note, that this holds to first approximation for any value of Δλ and ΔT. The same magnitude of the coefficients −0.65 and −0.35 in (24) and (25) improves the manufacturability of the lens system.

The grating and the non-periodic structure may also be made of different materials, such as glass and plastic, resulting in different coefficients in (24) and (25). Likewise, the lens may be made of glass or plastic. In a preferred embodiment of the lens system, the lens, grating and non-periodic structure are made of the same material, e.g. COC, and are preferably integrated in a single optical element.

FIG. 1 shows a device 1 according to the invention for scanning an optical record carrier 2. The record carrier comprises a transparent layer 3, on one side of which an information layer 4 is arranged. The side of the information layer facing away from the transparent layer is protected from environmental influences by a protection layer 5. The side of the transparent layer facing the device is called the entrance face 6. The transparent layer 3 acts as a substrate for the record carrier by providing mechanical support for the information layer. Alternatively, the transparent layer may have the sole function of protecting the information layer, while the mechanical support is provided by a layer on the other side of the information layer, for instance by the protection layer 5 or by a further information layer and a transparent layer connected to the information layer 4. Information may be stored in the information layer 4 of the record carrier in the form of optically detectable marks arranged in substantially parallel, concentric or spiral tracks, not indicated in the Figure. The marks may be in any optically readable form, e.g. in the form of pits, or areas with a reflection coefficient or a direction of magnetization different from their surroundings, or a combination of these forms.

The scanning device 1 comprises a radiation source 11 that can emit a radiation beam 12. The radiation source may be a semiconductor laser. A beam splitter 13 reflects the diverging radiation beam 12 towards a lens system comprising a collimator lens 14 and an objective system 18. The collimator lens 14 converts the diverging beam 12 into a collimated beam 15. The collimated beam 15 is incident on the objective system 18. The objective system comprises preferably a grating, an NPS and one or more lenses and/or mirrors. The objective system 18 has an optical axis 19. The objective system 18 changes the beam 15 to a converging beam 20, incident on the entrance face 6 of the record carrier 2. The objective system has a spherical aberration correction adapted for passage of the radiation beam through the thickness of the transparent layer 3. The converging beam 20 forms a spot 21 on the information layer 4. Radiation reflected by the information layer 4 forms a diverging beam 22, transformed into a substantially collimated beam 23 by the objective system 18 and subsequently into a converging beam 24 by the collimator lens 14. The beam splitter 13 separates the forward and reflected beams by transmitting at least part of the converging beam 24 towards a detection system 25. The detection system captures the radiation and converts it into electrical output signals 26. A signal processor 27 converts these output signals to various other signals. One of the signals is an information signal 28, the value of which represents information read from the information layer 4. The information signal is processed by an information processing unit for error correction 29. Other signals from the signal processor 27 are the focus error signal and radial error signal 30. The focus error signal represents the axial difference in height between the spot 21 and the information layer 4. The radial error signal represents the distance in the plane of the information layer 4 between the spot 21 and the center of a track in the information layer to be followed by the spot. The focus error signal and the radial error signal are fed into a servo circuit 31, which converts these signals to servo control signals 32 for controlling a focus actuator and a radial actuator respectively. The actuators are not shown in the Figure. The focus actuator controls the position of the objective system 18 in the focus direction 33, thereby controlling the actual position of the spot 21 such that it coincides substantially with the plane of the information layer 4. The radial actuator controls the position of the objective lens 18 in a radial direction 34, thereby controlling the radial position of the spot 21 such that it coincides substantially with the central line of track to be followed in the information layer 4. The tracks in the Figure run in a direction perpendicular to the plane of the Figure.

The device of FIG. 1 may be adapted to scan also a second type of record carrier having a thicker transparent layer than the record carrier 2. The device may use the radiation beam 12 or a radiation beam having a different wavelength for scanning the record carrier of the second type. The NA of this radiation beam may be adapted to the type of record carrier. The spherical aberration compensation of the objective system must be adapted accordingly.

The objective system 18 shown in FIG. 1 is formed by a single lens having an NA of 0.65 for operation at a wavelength of 660 nm. The lens is made of COC (Topas). The refractive index of COC is n=1.5309, the linear expansion coefficient a is equal to 60 $10^{-6}$/K, while the change $\beta$ of the refractive index as a function of temperature, i.e. $\beta$=dn/dT, is equal to $-10$ $10^{-5}$/K. The entrance pupil diameter of the objective lens is 3.3 mm.

FIG. 2 shows four different embodiments of the objective system. FIG. 2A shows embodiment one having an objective lens 39 without grating and NPS. FIG. 2B shows embodiment, two having an objective lens 39' and a grating 45. FIG. 2C shows embodiment three having an objective lens 39" and an NPS 50. FIG. 2D shows embodiment four having an objective lens 39''', a grating 45' and an NPS 50'. Embodiments two, three and four correspond to the three cases discussed in the section before the description of FIG. 1. Embodiment four is an embodiment according to the invention. The thickness on the optical axis of the objective lenses 39–39''' is 2.194 mm. Each objective lens has a surface 40, 40', 40", 40''' facing the radiation source and a surface 41, 41', 41", 41''' facing the record carrier; all surfaces are aspheric. The rotational symmetric shape of the surfaces can be described by the equation $$z(r)=B_2 r^2+B_4 r^4+B_6 r^6+\ldots$$

with z being the position of the surface in the direction of the optical axis in millimeters, r the distance to the optical axis in millimeters, and $B_k$ the coefficient of the $k^{th}$ power of r. The values of B2 to B12 for the surface of the objective lens facing the radiation source are tabulated in Table I for all the four embodiments. The surfaces 41, 41', 41", 41''' of the objective lenses facing the record carrier have the same shape given by the coefficients −0.1114228, 0.02852619, −0.0046668186, −0.0036752428, 0.0063619582, −0.007503492, 0.0046641069 and −0.0010757204, respectively. The distance between the objective lens and the entrance face 6 of the record carrier is defined as the free-working distance FWD and is listed in table I. The transparent layer 3 of the record carrier has a thickness of 0.6 mm and is made of polycarbonate having a refractive index n=1.5796, a linear expansion coefficient a equal to 67 $10^{-6}$/K, while the change, of the refractive index as a function of temperature, i.e. $\beta$=dn/dT, is equal to −11 $10^{-5}$/K. At the design temperature $T_0$ of 20° C. the lens has the correct spherical aberration compensation for the transparent layer 3 of the record carrier 2. When the temperature of the objective lens deviates from $T_0$, the change in shape of the lens and in the value of the refractive index cause additional spherical aberration to be introduced in the radiation beam proportional to the change in temperature. Since this aberration is not required for the compensation of the spherical aberration introduced by the transparent layer 3, the aberration will reduce the quality of the focal spot 21.

TABLE I

| Parameter | Embodiment 1 | Embodiment 2 | Embodiment 3 | Embodiment 4 |
|---|---|---|---|---|
| $B_2$ [mm$^{-1}$] | 0.30667827 | 0.29970341 | 0.30667449 | 0.30820682 |
| $B_4$ [mm$^{-3}$] | 0.012774652 | 0.011314413 | 0.012776297 | 0.0083940311 |
| $B_6$ [mm$^{-5}$] | −0.00056149226 | −0.0007343748 | −0.00056792823 | −0.00091696124 |
| $B_8$ [mm$^{-7}$] | 0.0010924384 | 0.0011029285 | 0.0010987024 | 0.0010979681 |
| $B^{10}$ [mm$^{-9}$] | −0.00039785742 | −0.00040268658 | −0.00040021226 | −0.00041309786 |
| $B^{12}$ [mm$^{-11}$] | 4.6929021 $10^{-5}$ | 4.7409304 $10^{-5}$ | 4.7244528 $10^{-5}$ | 4.9071182 $10^{-5}$ |
| FWD [mm] | 0.990 | 0.974 | 0.990 | 0.973 |
| A [mm$^{-2}$] | 0 | 47.3954 | 0 | 5.0000 |
| G [mm$^{-4}$] | 0 | 6.1780 | 0 | 24.1141 |
| $m_1$ | 0 | 0 | −1 | −3 |
| $m_2$ | 0 | 0 | −3 | −6 |
| $m_3$ | 0 | 0 | −1 | −3 |

Embodiments 2 and 4 of the lens system include a diffractive grating 45 and 45', respectively. The grating is on the surface of the lens facing the radiation source. The coefficient A and G defining the grating (see Equation (1)) are giving in Table I. The grating is of the blazed type in which substantially all the light is diffracted in the p=−1 order.

Embodiments 3 and 4 of the lens system include an NPS 50 and 50', respectively. The non-periodic phase structure is rotationally symmetric around the optical axis 19. The NPS is on the surface of the objective lens facing the radiation source and is made of the same material as the lens, in these embodiments COC. The phase structure has a central area 51 and four concentric annular areas 52, 53, 54 and 55. The annular areas 52, 53 and 54 are rings with a height of $h_1$, $h_2$ and $h_3$ above the height of the central area 51. The height of the areas in the Figure is exaggerated with respect to the thickness and radial extent of the surface 40". The plate 50 may also be made of the same material as the rings. The heights $h_j$ are each equal to $m_j h$, with $m_j$ an integer and h given by Equation (12). In this particular example where the NPS is of COC, the height h is equal to 1.2432 $\mu$m. Since each of the annular areas introduces a phase change of a $m_j$ $2\pi$ in the radiation beam at the design temperature, the phase structure does not change the wavefront of the radiation beam. When the temperature changes, the stepped phase structure will change shape. Hence, the height of the rings will change (proportional to the coefficient of linear expansion $\alpha$). Since the steps have been chosen to be wide, the change in width of the annular areas has a negligible effect. The refractive index of the material of the structure will also change (proportional to $\beta$=dn/dT). Consequently, the length of the optical paths through the annular areas depends on the temperature of the phase structure. The phase change introduced by this effect is (see Equation (13))

$$\Delta\Phi_j=-0.00081 m_j \Delta T$$

The radial extent of the four annular areas 51, 52, 53, 54 and 55 is: 0.0–0.48 mm, 0.48–0.85 mm, 0.85–1.47 mm, 1.47–1.60 mm, 1.60–1.65 mm, respectively. In Table I the values $m_j$ are tabulated for the four lens configuration.

TABLE II

| Configuration | Δλ = 3 nm (no refocusing) | ΔT = 30° C. | Δλ = 10 nm (re-focusing) |
|---|---|---|---|
| Lens | 36.5 mλ | 23.2 mλ | 4.8 mλ |
| Lens + grating | 8.2 mλ | 22.8 mλ | 8.9 mλ |
| Lens + NPS | 36.6 mλ | 18.6 mλ | 13.5 mλ |
| Lens + grating + NPS | 13.2 mλ | 13.3 mλ | 11.4 mλ |

Table II shows the root mean square value of the optical path difference of the wavefront aberration introduced by the lens system for three different settings. The first setting is where the wavelength has changed by Δλ=3 nm without refocusing the objective lens system; the aberration is a measure for chromatism of the lens system. The second setting is where the temperature has changed by ΔT=30° C.; the aberration is now a measure for the sensitivity of the lens system for temperature changes. The last setting is where the wavelength has changed by 10 nm while the objective lens system is re-focused; the aberration is a measure for the spherochromatism of the lens system. It should be noted that in designing the four lens configurations of Table I the above three settings have been taken into account in the merit function to optimize the lens system.

Table II shows that the lens without grating and NPS is chromatic and sensitive to temperature variations, while it is substantially a-spherochromatic. The lens system including a grating can easily be made achromatic, but the temperature dependence can hardly be reduced without introducing a significant amount of spherochromatism. The lens system including an NPS remains chromatic. The temperature dependence can be reduced to some extent, but the reduction is limited in order to keep the spherochromatism limited. Finally, the lens system including a grating and an NPS is an embodiment according to the invention and can indeed make the lens system substantially achromatic, a-thermal and a-spherochromatic.

Figure 3A:
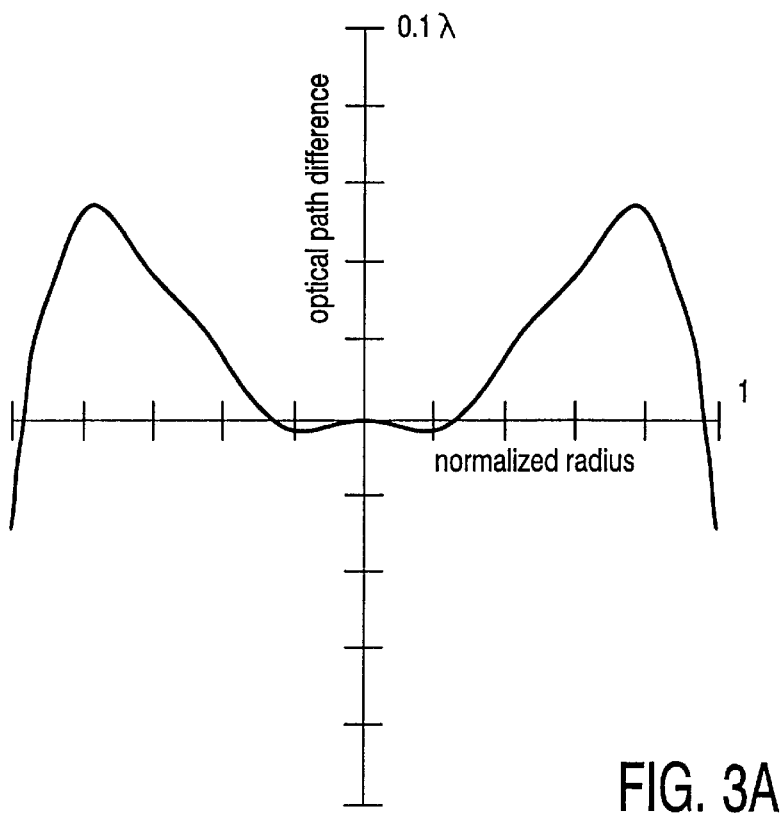
Figure 3B:
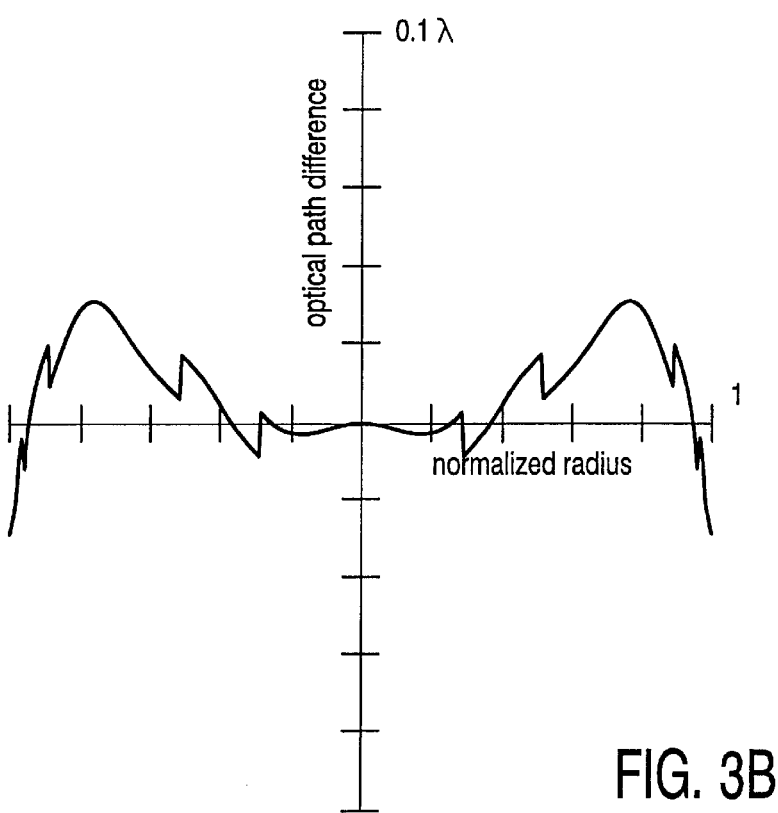

FIG. 3 shows the optical path difference for the lens system containing a grating and an NPS for the case where the temperature is increased by ΔT=30° C. In FIG. 3A the contribution of the NPS has been eliminated in order to determine its contribution to the optical path difference, while in FIG. 3B the contribution is taken into account.

Figure 4A:
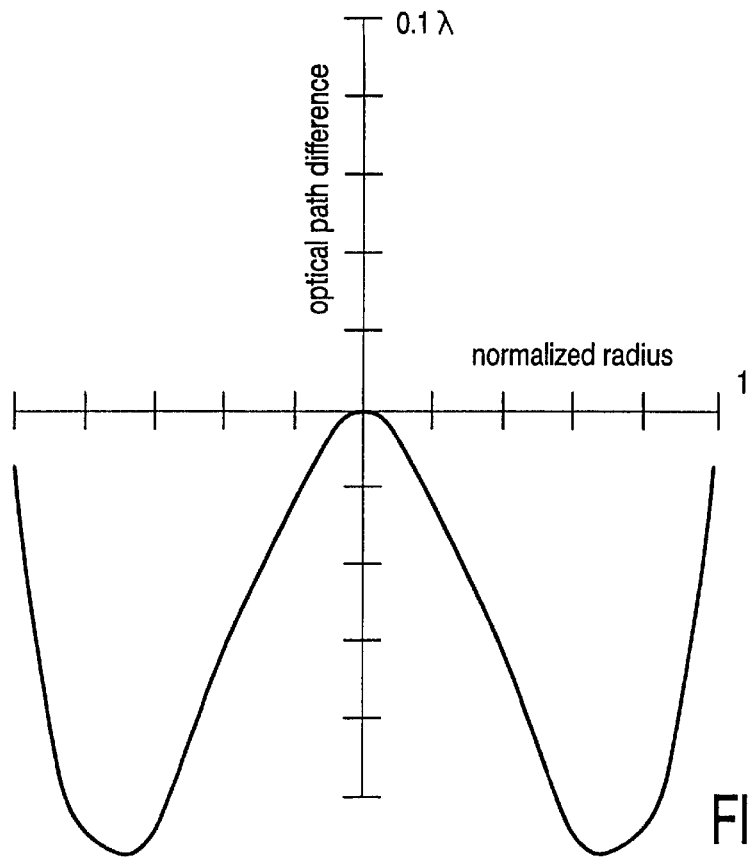
Figure 4B:
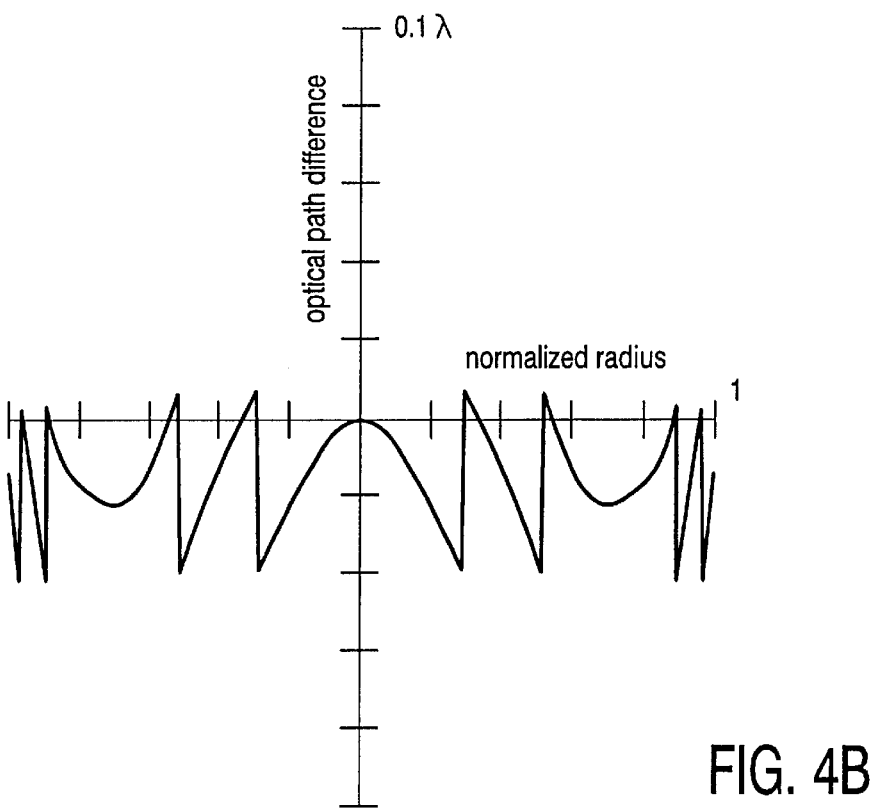

FIG. 4 shows the optical path difference for the lens system containing a grating and an NPS for the case where the wavelength has changed by 10 nm. Again in FIG. 4A the contribution of the NPS has been eliminated in order to determine its contribution to the optical path difference, while in FIG. 4B the contribution is taken into account. These Figures show that the combination of a grating and an NPS allows the reduction of spherical aberration due to temperature variations lens while at the same time the spherochromatism remains low.

What is claimed is:

1. A lens system including a lens, a grating and a non-periodic phase structure, the lens system being a-thermalised by a compensation of the temperature-dependence of the spherical aberration of the lens by the temperature-dependence of the spherical aberration of the non-periodic phase structure and the grating, and the lens system being aspherochromatised by a compensation of the wavelength-dependence of the spherical aberration of the grating by the wavelength-dependence of the spherical aberration of the non-periodic phase structure.

2. Lens system according to claim 1 where the lens system is made substantially achromatic.

3. An optical head for scanning an information layer of an optical record carrier, including a radiation source for generating a radiation beam, a lens system according to claim 1 for converging the radiation beam on the information layer, and a detection system for converting radiation from the information layer to an electrical detector signal.

4. An optical player for scanning an information layer of an optical record carrier, which player includes an optical head according to claim 3 and an information processing unit for error correction of the detector signal.

* * * * *